US012333046B2

(12) United States Patent
Chintalapati et al.

(10) Patent No.: US 12,333,046 B2
(45) Date of Patent: Jun. 17, 2025

(54) DATA PRIVACY ARCHITECTURE, SYSTEMS, AND METHODS

(71) Applicant: Truist Bank, Charlotte, NC (US)

(72) Inventors: Seshadri Chintalapati, Charlotte, NC (US); Joseph Matthew Law, Ankeny, IA (US); Josephine Middleton-Saulny, Atlanta, GA (US); Chris McClennen, Charlotte, NC (US); Phani Kumar Ankani, Atlanta, GA (US)

(73) Assignee: TRUIST BANK, Charlotte, NC (US)

( * ) Notice: Subject to any disclaimer, the term of this patent is extended or adjusted under 35 U.S.C. 154(b) by 220 days.

(21) Appl. No.: 18/161,133

(22) Filed: Jan. 30, 2023

(65) Prior Publication Data

US 2024/0005037 A1    Jan. 4, 2024

Related U.S. Application Data

(60) Provisional application No. 63/371,657, filed on Aug. 17, 2022, provisional application No. 63/367,426, filed on Jun. 30, 2022.

(51) Int. Cl.
*H04L 9/00* (2022.01)
*G06F 3/0482* (2013.01)
*G06F 21/62* (2013.01)

(52) U.S. Cl.
CPC ........ *G06F 21/6245* (2013.01); *G06F 3/0482* (2013.01); *G06F 21/6254* (2013.01)

(58) Field of Classification Search
CPC . G06F 21/6245; G06F 3/0482; G06F 21/6254
See application file for complete search history.

(56) References Cited

U.S. PATENT DOCUMENTS

2016/0134716 A1 * 5/2016 Hyman ................. H04L 67/306
   709/224
2019/0391898 A1 * 12/2019 Vichare ............... G06F 9/44505

* cited by examiner

*Primary Examiner* — Syed M Ahsan
(74) *Attorney, Agent, or Firm* — Michael A. Springs, Esq.; Shumaker, Loop & Kendrick, LLP; Patrick B. Horne (57) ABSTRACT

Systems, apparatuses, and methods for managing privacy of data are provided. The method includes providing at least one processor in communication with the at least one database, a memory device including readable instructions, and at least one of an agent device and a user device in communication with the at least one processor via a network connection; receiving at least one communication request related to user data; collecting usage data of the user data; and transmitting the communication containing the usage data to a user.

14 Claims, 5 Drawing Sheets

DATA PRIVACY ARCHITECTURE, SYSTEMS, AND METHODS

CROSS-REFERENCE TO RELATED APPLICATION

This application claims the benefit of U.S. Provisional Patent Application Serial Nos. 63/367,426, filed Jun. 30, 2022, and 63/371,657, filed Aug. 17, 2022, the entireties of which are herein incorporated by reference.

FIELD

The invention relates generally to data privacy, and more particularly to architecture, systems, and methods for managing data privacy.

BACKGROUND

Data privacy, or information privacy, often refers to a specific kind of privacy linked to personal information that is provided from individuals to private enterprises in a variety of different applications. Currently, protections for personal information are sector-specific, including personal health information, educational information, children's information, and financial information, and each has different enforcement mechanisms and unique requirements on consent and disclosure. However, data privacy is ever-evolving in how personal information is used and how it is regulated. The future of data privacy will likely require greater protections and more affirmative rights for individuals.

Accordingly, it would be desirable to develop architecture, systems, and methods for managing data privacy that provide enhanced data privacy protection and control.

BRIEF SUMMARY

In concordance and agreement with the present invention, architecture, systems, and methods for managing data privacy that provide enhanced data privacy protection and control, have surprisingly been discovered.

In one embodiment, a system for managing data, the system comprises: a computing system including at least one processor and at least one memory, wherein the computing system executes computer-readable instructions; and a network connection operatively connecting the computing system to at least one of an agent device and a user device; wherein, upon execution of the computer-readable instructions, the at least one processor performs steps comprising: receiving at least one communication request related to user data; collecting usage data of the user data; and transmitting the at least one communication containing the usage data of the user data to a user.

In some embodiments, the at least one processor further performs the step of verifying credentials of an unauthenticated user of a data privacy application.

In some embodiments, the at least one processor further performs the step of verifying identification documentation of an unauthenticated user of a data privacy application.

In some embodiments, the at least one processor further performs the step of filtering the user data prior to transmitting the communication containing the usage data to the user.

In some embodiments, the at least one communication request is received via a data privacy application.

In some embodiments, the at least one communication request is received from an authenticated user of a data privacy application.

In some embodiments, the at least one communication request is received from an unauthenticated user of a data privacy application.

In some embodiments, the at least one communication request is received via a graphical user interface of a data privacy application.

In some embodiments, the at least one communication request is received from an agent of an enterprise system.

In some embodiments, the communication containing the usage data is hosted on a data privacy application.

In another embodiment, a method for managing data, comprises the steps of: providing at least one processor in communication with the at least one database, a memory device including readable instructions, and at least one of an agent device and a user device in communication with the at least one processor via a network connection; receiving at least one communication request related to user data; collecting usage data of the user data; and transmitting the communication containing the usage data to a user.

In some embodiments, the method further comprises the step of verifying credentials of an unauthenticated user of a data privacy application.

In some embodiments, the method further comprises the step of verifying identification documentation of an unauthenticated user of a data privacy application.

In some embodiments, the method further comprises the step of filtering the user data prior to transmitting the communication containing the usage data to the user.

In some embodiments, the at least one communication request is received via a data privacy application.

In some embodiments, the at least one communication request is received from an authenticated user of a data privacy application.

In some embodiments, the at least one communication request is received from an unauthenticated user of a data privacy application.

In some embodiments, the at least one communication request is received via a graphical user interface of a data privacy application.

In some embodiments, the at least one communication request is received from an agent of an enterprise system.

In some embodiments, the communication containing the usage data is hosted on a data privacy application.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

The above-mentioned, and other features and objects of the inventions, and the manner of attaining them will become more apparent and the invention itself will be better understood by reference to the following description of embodiments of the invention taken in conjunction with the accompanying drawings, wherein.

DETAILED DESCRIPTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Figure 1:
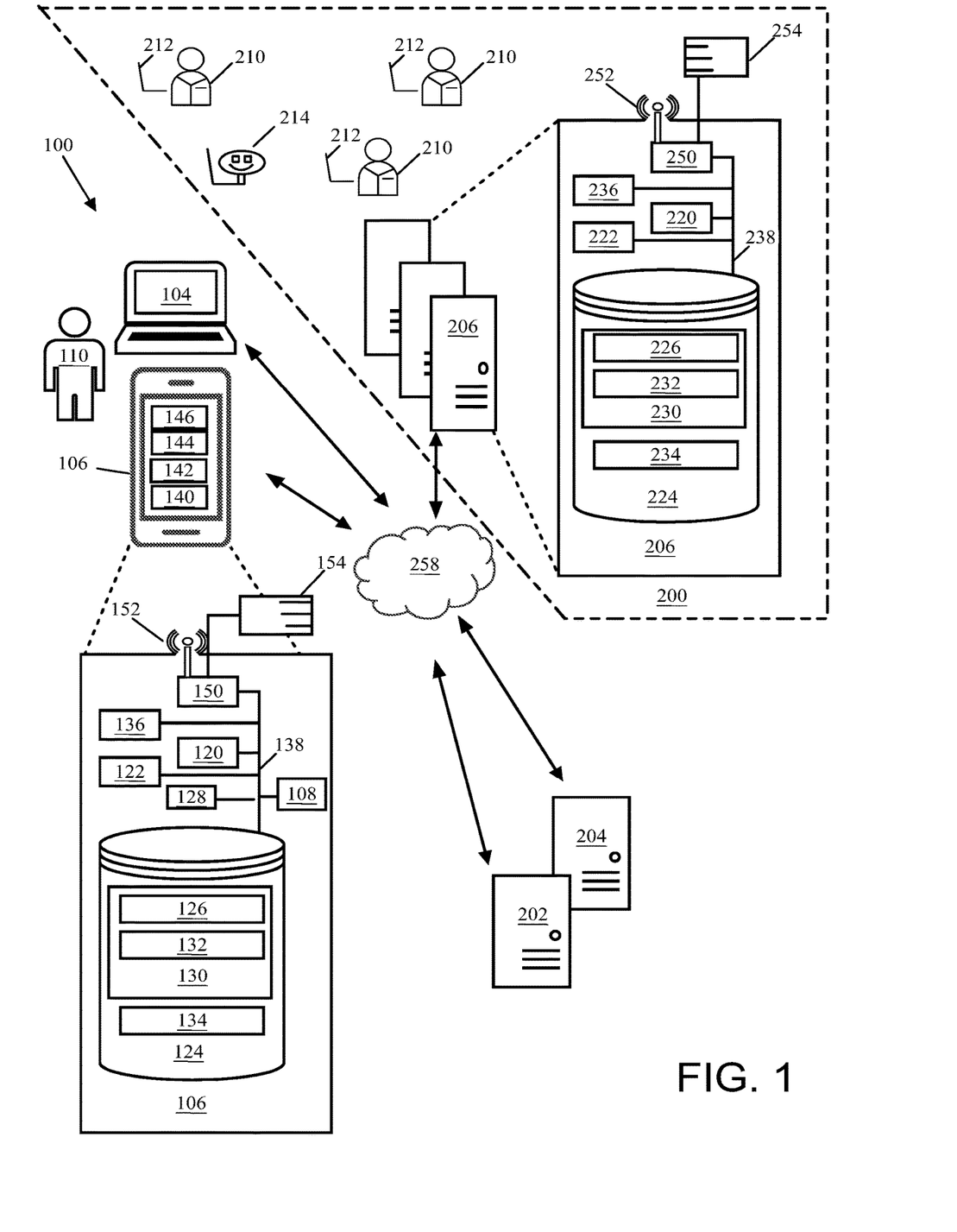
FIG. 1 is a schematic diagram illustrating an enterprise system and environment thereof for implementing a data privacy application in accordance with an embodiment of the presently described subject matter.

FIG. 1 illustrates a system 100 and environment thereof, according to at least one embodiment, by which a user 110 benefits through use of services and products of an enterprise system 200. The environment may include, for example, a distributed cloud computing environment (private cloud, public cloud, community cloud, and/or hybrid cloud), an on-premise environment, fog computing environment, and/or an edge computing environment. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning system device (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

Figure 2A:
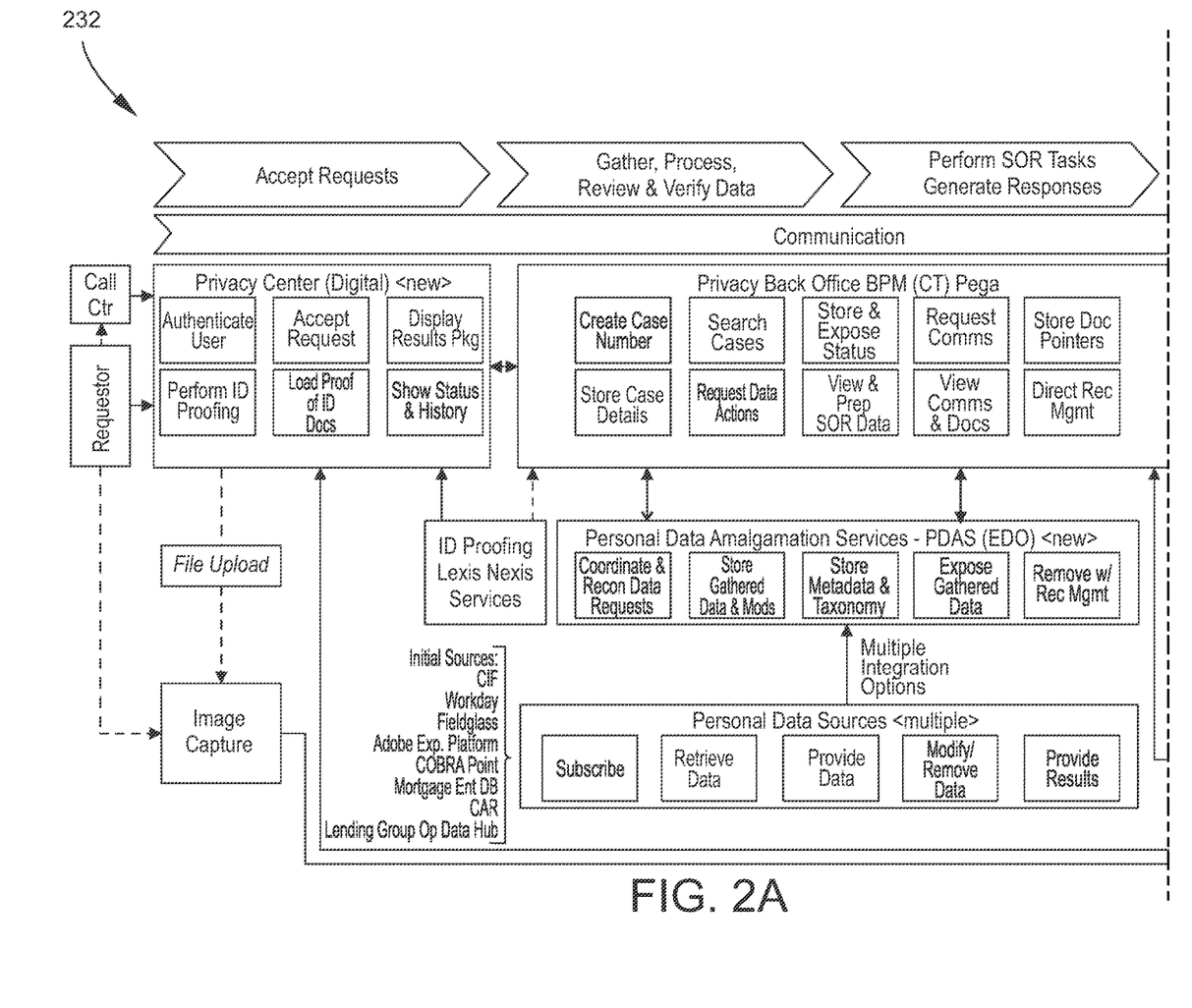
FIGS. 2A and 2B are flow diagrams illustrating a data flow architecture of a data privacy application according to an embodiment of the present disclosure.
Figure 2B:
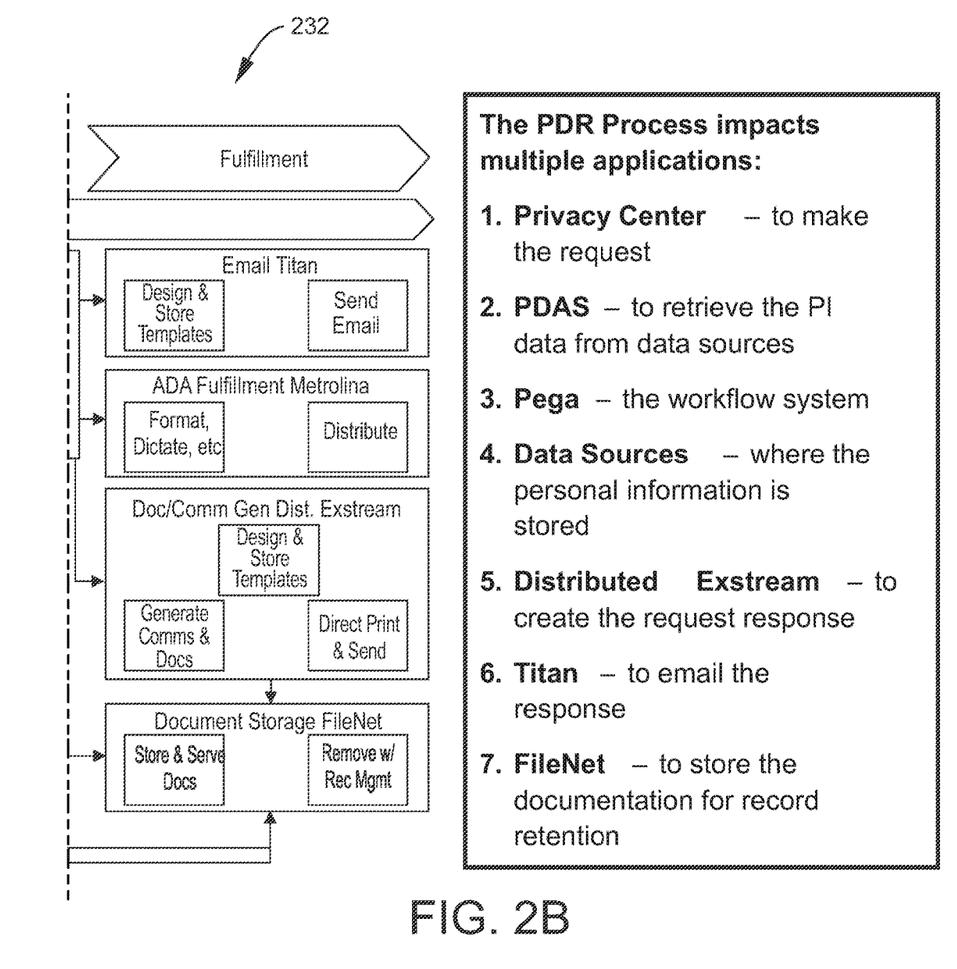

One of the programs 230 of the enterprise system 200 may be a data privacy application 232, a preferred architecture of which is shown in FIGS. 2A and 2B. The data privacy application 232 may be used by an enterprise to provide the users 110 with increased transparency, control, and insights into use and protection of their personal information.

In an embodiment, the enterprise system 200 allows the users 110 to request usage communications of personally identifiable information (PII) data via the data privacy application 232. Such communications request is referred to hereinafter as a Personal Data Request (PDR). The PII data may include sensitive data and domain specific data. Herein, the PII data may refer to the data that may be utilized for determining identity of the user. Examples of fields including the PII data in case of the data privacy application 232 may include permanent account numbers, date of birth, e-mail address, residential address, and mobile numbers, for example. The PII data may also include data that can pose a risk or affect the user 110 financially or otherwise, if disclosed in public. In an embodiment, the PII data may include domain specific fields, and can be generated by the enterprise. Examples of the PII data for a financial institution such as a bank may include financial information such as debit and/or credit card numbers, CVV number, account balance, card expiry date, and other such fields, for example. As depicted, the data privacy application 232 may receive one or more PDRs from a requestor. The requestor may be one of the users 110 or the agents 210 of the enterprise system 200. The PII data may be provided by various data sources to the data privacy application 232. Suppression rules and criteria are applied to the collected PII data and the PII data is suppressed, scrubbed, and/filtered. The filtered PII data may then be outputted to the user 110 and/or stored by the data privacy application 232 for fulfillment.

Operations of the method, and combinations of operation in the method, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the method.

Figure 3A:
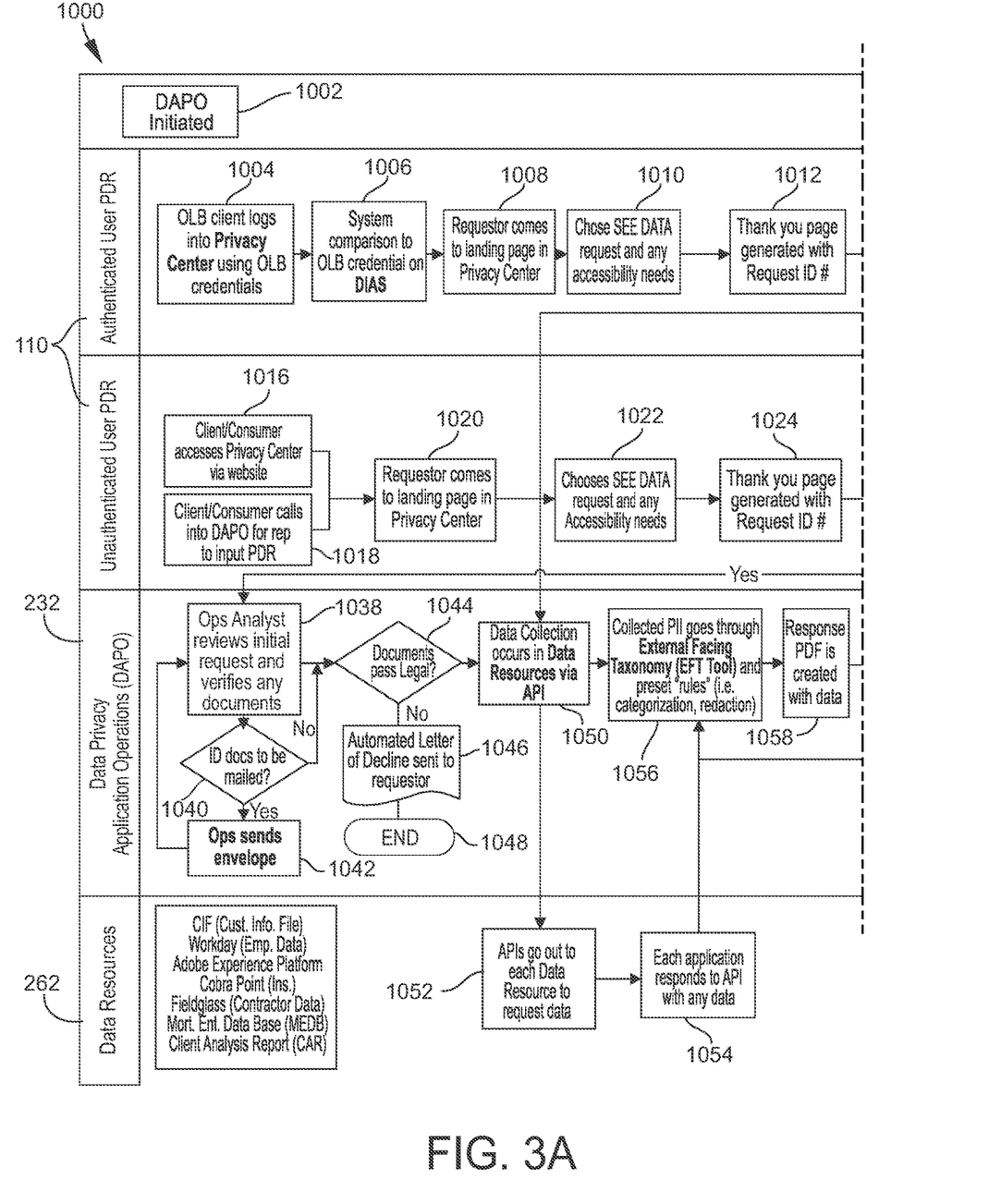
FIGS. 3A and 3B are flow diagrams illustrating a method for requesting a usage communication of personally identifiable information (PII) data via the data privacy application of FIGS. 2A and 2B.
Figure 3B:
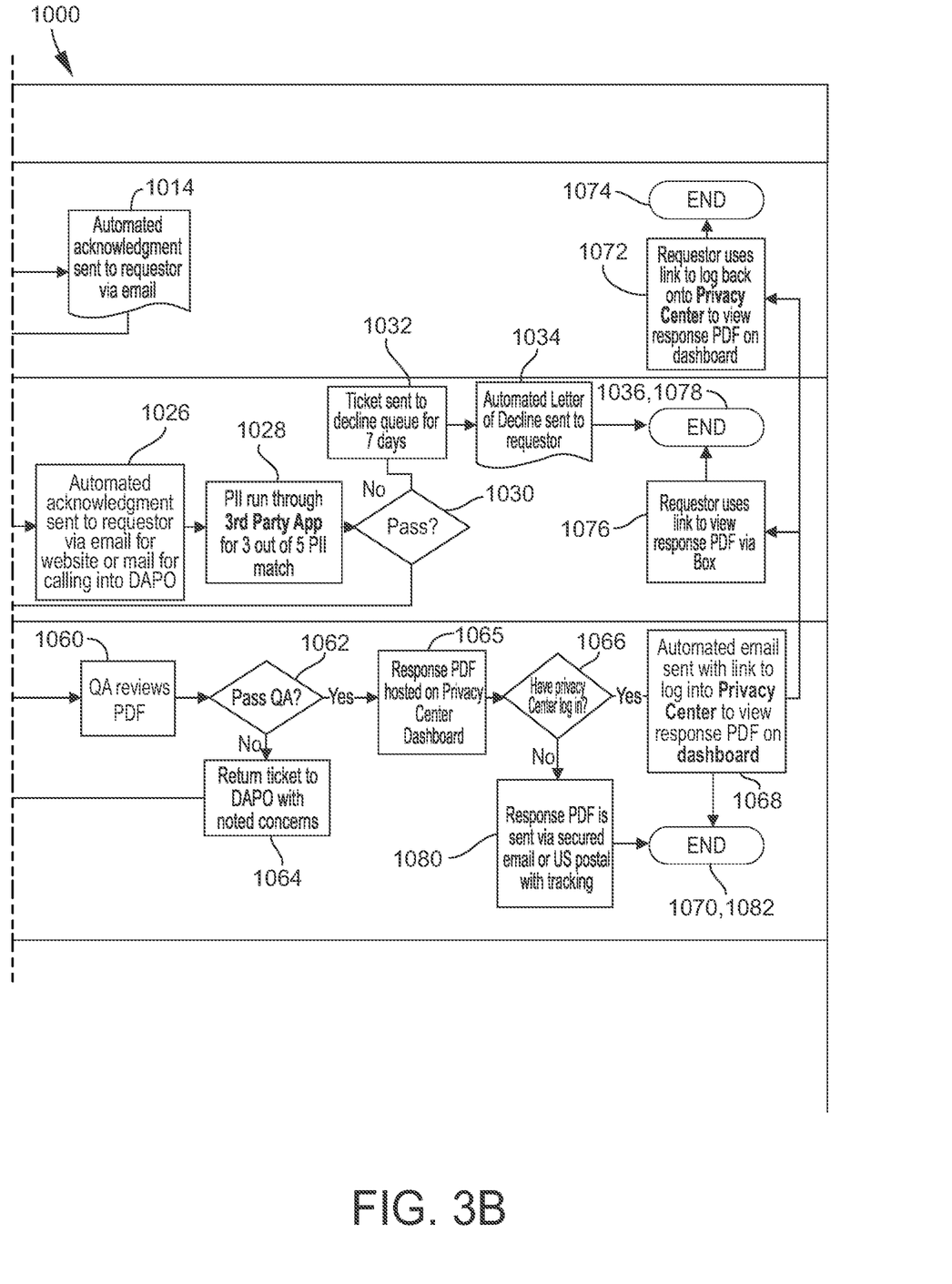

FIGS. 3A and 3B depict an exemplary method 1000 employed for the PDRs. The method 1000 depicted may be executed by an application of a system, for example, the data privacy application 232 of the enterprise system 200 of FIG. 1. In an example embodiment, the data privacy application 232 may be accessed via a graphical user interface (GUI) of a computing device, for example, the computing device 104 and/or the mobile device 106 of the user 110 of FIG. 1.

In some embodiments, the privacy data application 232 allows the requestors, including the users 110 (e.g., authenticated and unauthenticated users) and/or the agents 210 of the enterprise system 200, to request and receive communications related to usage of the PII data. The authenticated users 110 may be an individual and/or entity that has an online user ID. The unauthenticated users 110 (e.g. guests) may be those without an online user ID or entirely new users of the application 232. The communications may include details as to how the PII data of the users 110 is being used by the enterprise and/or the enterprise system 200.

In some embodiments, the method 1000 may include steps for initiating communication requests and/or controlling the PII data of the users 110. As depicted in FIGS. 3A and 3B, the data privacy application 232 may utilize and/or be in communication with various data resources 262, including but not limited to a privacy preferences and consent management module, a customer information file (CIF), a workday module for employee data, an Adobe experience platform, an insurance module (e.g., Cobra Point), contractor data (e.g., Fieldglass), a mortgage enterprise database, a client analysis report (CAR), at least one of the applications 230 upstream of the data privacy application 232, at least one third-party system (e.g., LexisNexis), an enterprise data lake (EDL), EDL whole files, a data filter, a custom data module (CDM), at least one of the applications 230 downstream of the data privacy application 232, and a marketing module. It should be appreciated that the data privacy application 232 may utilize more or less of the applications 230 and/or the systems 202, 204 of the enterprise system 200.

In step 1002 of the method 1000, the user 110 executes the data privacy application 232 using the computing device 104 and/or the mobile device 106. In step 1004, the user 110 inputs credentials into the data privacy application 232. Once the privacy data application 232 authenticates the credentials of the user 110, in step 1006, a personal dashboard is provided at step 1008. The personal dashboard may include a personalized landing page of the user 110.

From the personal dashboard, in step 1010, the user 110 initiates a communications request for a communication (i.e., "SEE DATA REQUEST") and/or any accessibility needs (e.g., large font, etc.). When the communications request is initiated, the user 110, in step 1012, receives a confirmation, for example, a confirmation page that the communications request has been submitted and/or a request identification number. In step 1014, an acknowledgement communication may be transmitted to the user 110. The acknowledgment communication may be automatically generated and sent to the user 110 and/or transmitted by various means such as by electronic mail, for example. Upon completion of the communications request related to usage of the PII data, the user 110 may then close the PDR module and return to manage other preferences and data, and/or logout of the data privacy application 232. The data privacy application 232 may then proceed to step 1050 as described hereinafter.

If the user 110 is not an authenticated user 110, the user 110 may login as an unauthenticated user or guest at step 1016 or, alternatively, by contact with at least one of the agents 210 (i.e., via telephonic means) at step 1018. Similar to the login as the authenticated user, the data privacy application 232 may require an input of certain credentials. When the user 110 is logged in as the unauthenticated user or guest or contacts the at least one of the agents 210, a generic dashboard is provided to the user 110 or the at least one agents 210 at step 1020. The generic dashboard may include a generic landing page of the data privacy application 232.

From the generic dashboard, the user 110 or the at least one agent 210, in step 1022, initiates a communications request for a communication (i.e., "SEE DATA REQUEST") and/or any accessibility needs (e.g., large font, etc.). When the communications request is initiated, the user 110 or the at least one agent 210, in step 1024, receives a confirmation, for example, a confirmation page that the communications request has been submitted and/or a request identification number. In step 1026, an acknowledgement communication may be transmitted to the user 110. The acknowledgment communication may be automatically generated and sent to the user 110 and/or transmitted by various means such as by electronic mail or U.S. mail, for example. In certain embodiments, the user 110 may receive the acknowledgment communication via electronic mail when the generic dashboard is used directly by the user 110 and by U.S. mail when the generic dashboard is accessed by the at least one agent 210. Upon completion of the communications request related to usage of the PII data, the user 110 and/or the at least one agent 210 may then close the PDR module and return to manage other preferences and data, and/or logout of the data privacy application 232.

Thereafter, at step 1028, the credentials of the user 110 are subjected to a validation process. In some embodiments, the validation process may be conducted by a third-party application such as LexisNexis, for example. The validation process may require validation of all of the credentials of the user 110, or only a portion thereof. For example, if the credentials include five criteria items, the validation process may only require three of those five criteria items to be accurate. When the credentials do not pass the validation process at step 1030, an internal communication is transmitted to a decline queue of the data privacy application 232, at step 1032. The internal communication may be held in the decline queue for a predetermined period of time (i.e., a number of days or weeks). After expiration of the predetermined period of time, at step 1034, a communication containing notification of the decline of the communications request for the usage data of the PII data may be transmitted to the user 110. It is understood that the communication containing the notification of the decline of the communications request for the usage data of the PII data may be automatically generated. Once the communication of the declination of the communications request is transmitted to the user 110, the data privacy application 232 is ended at step 1036.

When the credentials pass the validation process at step 1030, at least one of the agents 210 of the enterprise system 200 may review the communications request for the usage data of the PII data and/or any identification documentation included therewith at step 1038. At step 1040, the data privacy application 232 then determines whether user identification documentation still is required to be submitted. If yes, the at least one of the agents 210 of the enterprise system 200 transmits a request for such identification documentation (i.e. an envelope and/or submission instructions) at step 1042. Upon submission of the requested identification documentation, step 1038 is repeated. If additional identification documentation is not required, the submitted identification documentation is examined for legality at step 1044. If the submitted identification documentation is determined to be legally insufficient, a communication containing notification of the decline of the communication request for the usage data of the PII data may be transmitted to the user 110 at step 1046. It is understood that the communication containing the notification of the decline of the communications request for the usage data of the PII data may be automatically generated. Once the communication of the declination of the communications request is transmitted to the user 110, the data privacy application 232 is ended at step 1048. Conversely, if the submitted identification documentation is determined to be legally sufficient, at step 1044, the data privacy application 232 proceeds to step 1050.

Once the communications request for the usage data of the PII data is initiated by the user 110 and/or verified by the data privacy application 232, the data privacy application 232 commences a collection of the PII data, at step 1050. The PII data collection may be conducted by the data privacy application 232 via the APIs. In some instances, the data privacy application 232, at step 1052, may be in communication various the data resources 262. At step 1054, one or more of the data resources 262 may transmit the collected PII data to the data privacy application 232. The collected PII data may be communicated via the APIs. The collected PII data may be filtered at step 1056. An external facing taxonomy (EFT tool) may be employed to conduct the filtering of the collected PII data. In certain embodiments, the collected PII data may be compared to predetermined rules and/or criteria to delete unnecessary and/or undesired segments of the PII data. At step 1058, the filtered PII data is transformed by the data privacy application 232 into a communication (e.g., an electronic file) containing usage data of the filtered PII data. The communication containing the usage data of the filtered PH data may then be reviewed for quality assurance, at step 1060. When the communication containing the usage data of the filtered PH data does not meet quality assurance standards at step 1062, a notification with concerns is transmitted to at least one of the agents 210 of the enterprise system 200 at step 1064. Thereafter, the step 1056 may be repeated and the collected PH data may be further filtered to address the concerns provided in the notification transmitted at step 1064. The steps 1056 thru 1064 are repeated until the communication containing the usage data of the filtered PII data meets the quality assurance standards, at step 1062. When the communication containing the usage data of the filtered PII data meets the quality assurance standards at step 1062, the communication containing the usage data of the filtered PII data may then be provided and/or hosted on the personal dashboard of the user 110 by the privacy data application 232 at step 1065.

When the user 110 is determined to have a login to the data privacy application at step 1066, either by being an authenticated user 110 or an agent 210, a communication is directly transmitted thereto. In some embodiments, the communication is transmitted via electronic mail and contains a link to log into the data privacy application 232 and view the communication containing the usage data of the PII data of the user 110 on the personal dashboard at step 1068. Upon transmittal of the electronic mail containing the link, the data privacy application 232 is ended at step 1070. At step 1072, the authenticated user 110 uses the link in the communication to log into the data privacy application 232 and view the communication containing the usage data of the PII data of the user 110. Once the authenticated user 110 has viewed such communication, the data privacy application is ended at step 1074. Alternatively, at step 1076, the agent 210 of the enterprise system 200 and/or the unauthenticated user 110 uses the link in the communication to log into the data privacy application 232 and view the communication containing the usage data of the PII data of the user 110. Similar to step 1074, once such communication has been viewed, the data privacy application is ended at step 1078.

Referring back to step 1066, when the user 110 does not have a login to the data privacy application, a communication is transmitted to the user 110 via secured electronic mail and/or U.S. mail with tracking. Upon transmittal of the electronic mail and/or the U.S. mail with tracking, the data privacy application 232 is ended at step 1082.

The data privacy application 232 may be a mechanism to provide the users 110 with transparency into the PII data collected by the enterprise system 200 and how it is used as well as an understanding of how privacy and security are handled. The data privacy application 232 will enable compliance with regulatory requirements, build trust and secure market share, enabling a broader, more dynamic use of the PII data. More importantly, the data privacy application 232 provides a positive user experience. Features of the data privacy application 232 are expandable as user expectations and privacy regulations evolve over time.

In an embodiment, the enterprise system 200 may be caused to transmit a communication containing the usage data of the filtered PII data based at least on one of a plurality of preconfigured rules and criteria. In an embodiment, the plurality of preconfigured rules and criteria may be defined based on a user input and/or regulations. Since the enterprise system 200 is extensible and flexible, the communications containing the usage data of the filtered PII data defined herein are not static, and can be updated by adding, deleting, and/or replacing rules and criteria.

The use of the data privacy application 232 improves the efficiency of the human agents 210 and operation of the computing system 206 in various different respects. First, the disclosed method eliminates unnecessary time, effort, and communications relating to certain tasks performed by the human agents 210 and/or the computing system 206 that have been found to not have a positive impact on securing the usage data for the PII data from the various data resources. This may be especially relevant where extensive costs can be avoided by verifying requestor credentials and filtering the PII data prior to transmittal of any communication. This results in the human agents 210 and the computing system 206 avoiding a waste of resources when performing certain tasks. Second, the use of the data privacy application 232 also allows for certain variables in the data 234 to be determined to be private and further allows for the computing system 206 to be simplified by means of the elimination of undesired interactions. Third, the data privacy application 232 provides greater insight to the users 110 with respect to usage of their PII data by the enterprise system 200. Each of the described advantages reduces network traffic as experienced by the computing system 206 due to the ability to initiate a communications request via the data privacy application via the graphical user interface.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A system for managing data, the system comprising:
   a computing system including at least one processor and at least one memory, wherein the computing system executes computer-readable instructions;
   at least one user device;
   one or more data resources; and
   a network connection operatively connecting the computing system to the at least one user device and the one or more data resources;
      wherein, upon execution of the computer-readable instructions, the computing system is configured to:
   providing, by the at least one processor to the at least one user device, a user software application to a user for installation on the at least one user device, wherein the at least one user device is configured to wirelessly communicate with the computing system via the user software application;

providing, by the at least one processor to access to a data privacy application via a graphical user interface of the at least one user device, wherein the at least one user device is configured to wirelessly communicate with the computing system via the data privacy application, and wherein the data privacy application reduces network traffic experienced by the computing system;

receive, by the at least one processor from the user software application installed on the at least one user device, user data comprising personal information data of the user;

store the user data in at least one database;

receive, by the at least one processor from a user-specific dashboard of the data privacy application, at least one communication request related to usage of the personal information data;

collect, by the at least one processor, personal information usage data from the one or more data resources;

filter, by the at least one processor, the personal information usage data to allow for certain variables in the personal information usage data to be determined private and further allows for the computing system to be simplified by eliminating undesired interactions;

transform, by the at least one processor, the filtered personal information usage data into at least one communication containing the filtered personal information usage data;

transmit, by the at least one processor to the user-specific dashboard of the data privacy application, the at least one communication containing the personal information usage data to the at least one user device.

2. The system of claim 1, wherein, upon execution of the computer-readable instructions, the computing system is further configured to verify credentials of an unauthenticated user of the data privacy application.

3. The system of claim 1, wherein, upon execution of the computer-readable instructions, the computing system is further configured to verify identification documentation of an unauthenticated user of the data privacy application.

4. The system of claim 1, wherein the at least one communication request is received from an authenticated user of the data privacy application.

5. The system of claim 1, wherein the at least one communication request is received from an unauthenticated user of the data privacy application.

6. The system of claim 1, wherein, upon execution of the computer-readable instructions, the computing system is further configured to receive another communication request related to usage of the personal information data from at least one agent device of the system.

7. The system of claim 1, wherein the at least one communication containing the filtered personal information usage data is hosted on the data privacy application.

8. A method for managing data, comprising the steps of:
providing a computing system including at least one processor and at least one memory, wherein the computing system executes computer-readable instructions;
providing at least one user device;
providing one or more data resources;
providing a network connection operatively connecting the computing system to the at least one user device and the one or more data resources;
providing, by the at least one processor to the at least one user device, a user software application to a user for installation on the at least one user device, wherein the at least one user device is configured to wirelessly communicate with the computing system via the user software application;
providing, by the at least one processor to access to a data privacy application via a graphical user interface of the at least one user device, wherein the at least one user device is configured to wirelessly communicate with the computing system via the data privacy application, and wherein the data privacy application reduces network traffic experienced by the computing system;
receiving, by the at least one processor from the user software application installed on the at least one user device, user data comprising personal information data of the user; store the user data in at least one database;
receiving, by the at least one processor from a user-specific dashboard of the data privacy application, at least one communication request related to usage of the personal information data;
collecting, by the at least one processor, personal information usage data from the one or more data resources;
filtering, by the at least one processor, the personal information usage data to allow for certain variables in the personal information usage data to be determined private and further allows for the computing system to be simplified by eliminating undesired interactions;
transforming, by the at least one processor, the filtered personal information usage data into at least one communication containing the filtered personal information usage data;
transmitting, by the at least one processor to the user-specific dashboard of the data privacy application, the at least one communication containing the personal information usage data to the at least one user device.

9. The method of claim 8, further comprising the step of verifying credentials of an unauthenticated user of the data privacy application.

10. The method of claim 8, further comprising the step of verifying identification documentation of an unauthenticated user of the data privacy application.

11. The method of claim 8, wherein the at least one communication request is received from an authenticated user of the data privacy application.

12. The method of claim 8, wherein the at least one communication request is received from an unauthenticated user of the data privacy application.

13. The method of claim 8, further comprising the step of receiving another communication request related to usage of the personal information data from at least one agent device of the system.

14. The method of claim 8, wherein the at least one communication containing the filtered personal information usage data is hosted on the data privacy application.

* * * * *